United States Patent Office

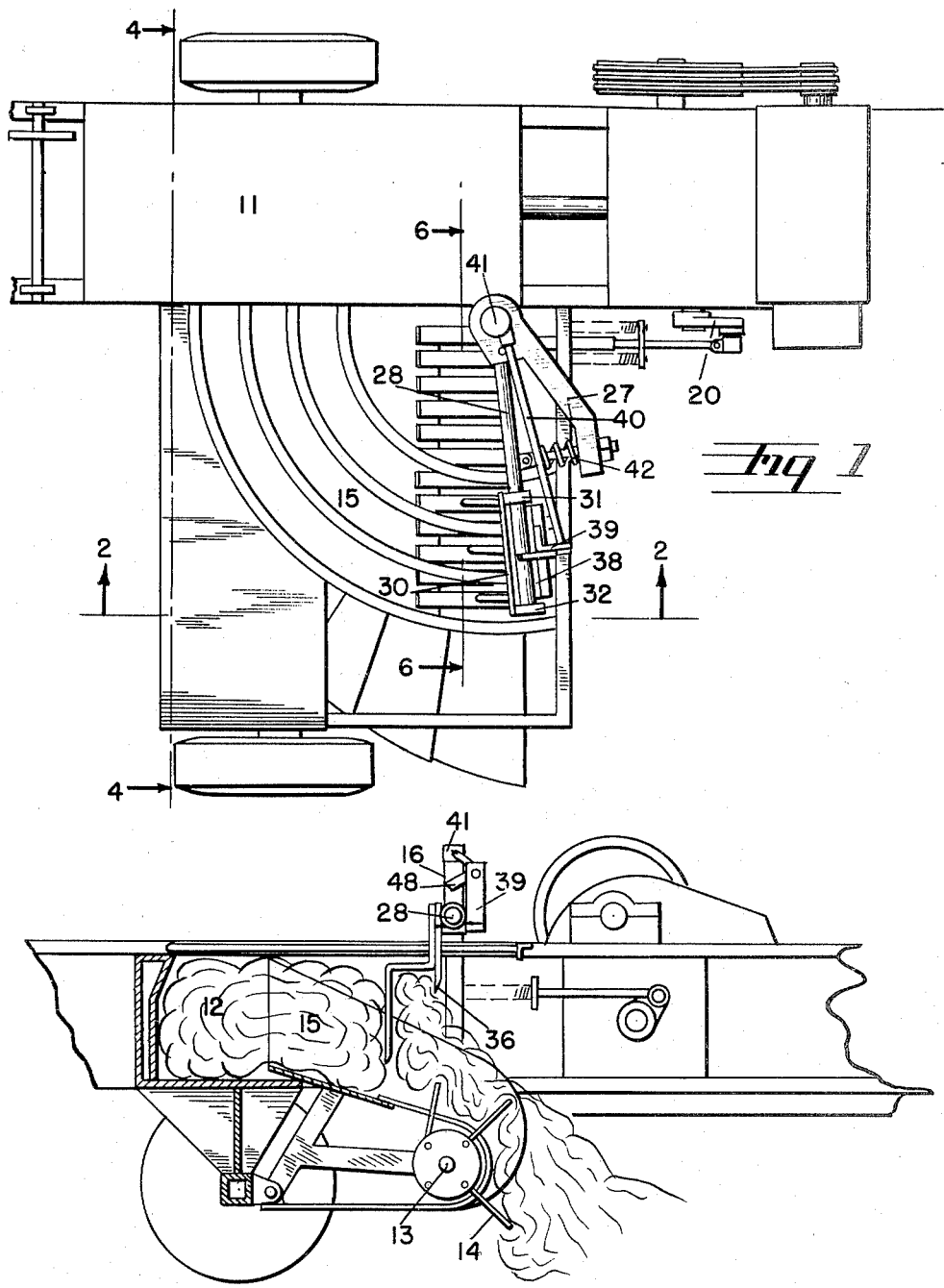

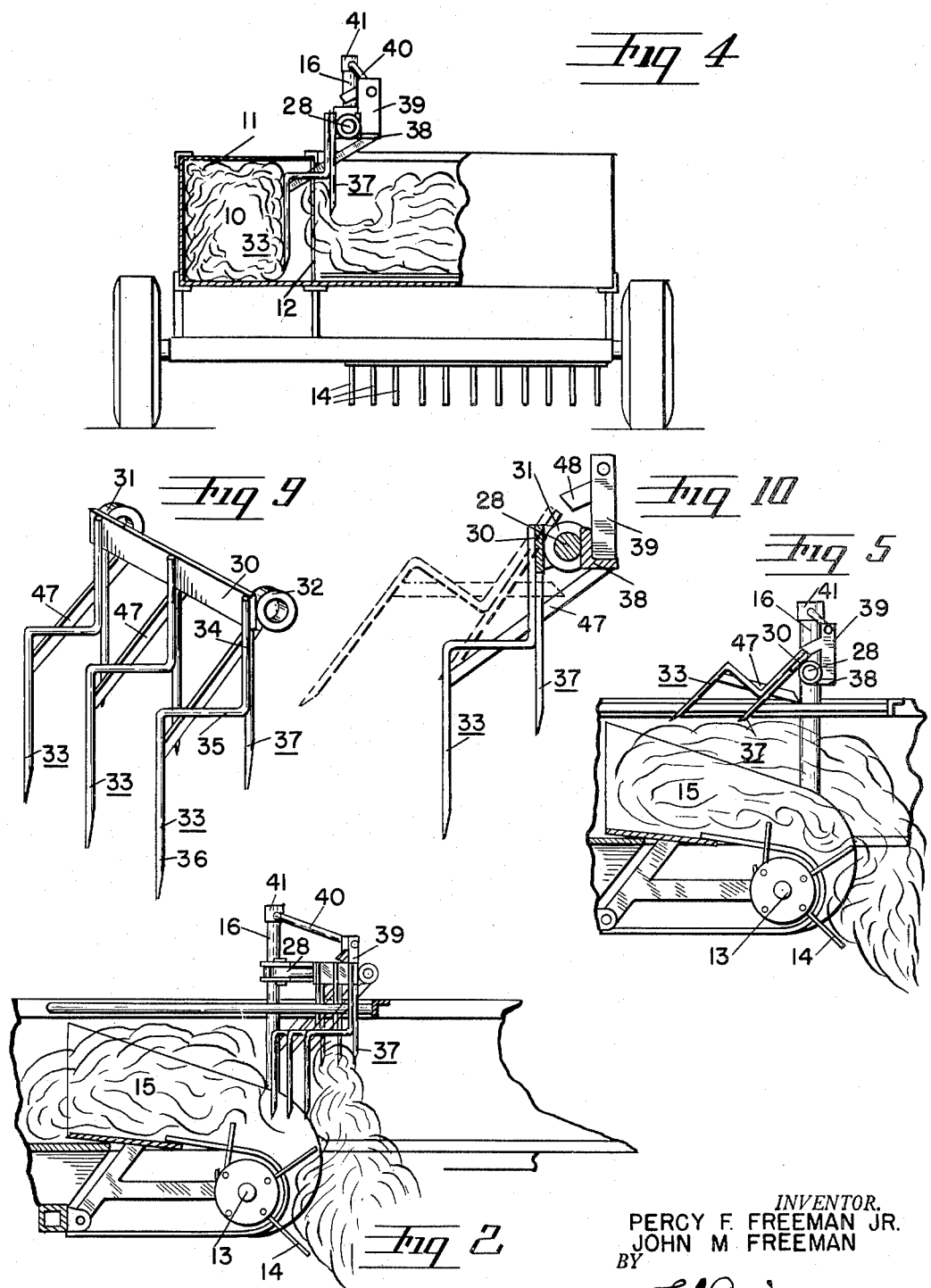

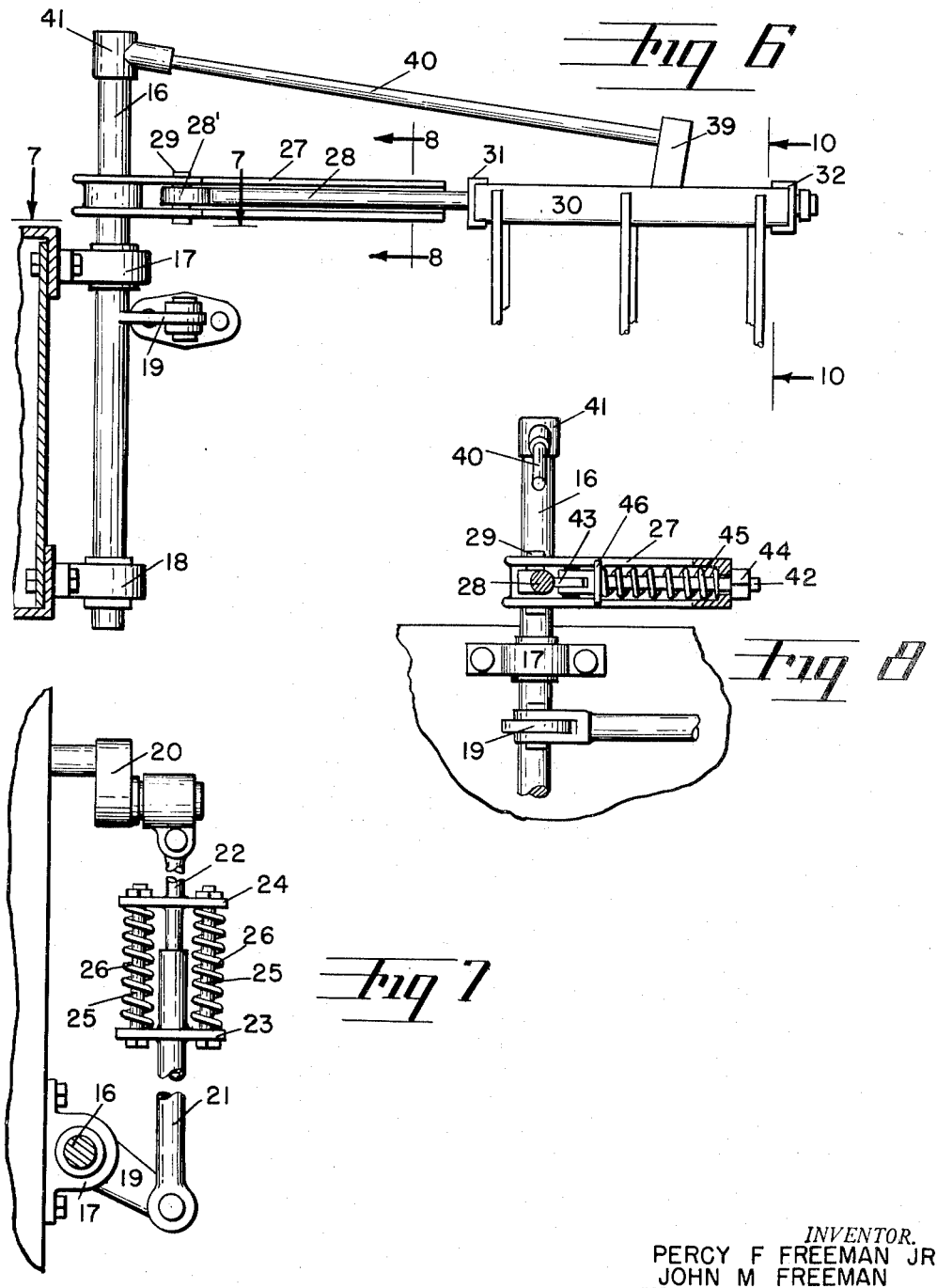

2,720,073
Patented Oct. 11, 1955

2,720,073

HAY BALER FEEDING ASSEMBLY

Percy F. Freeman, Jr. and John M. Freeman,
Portland, Oreg.

Application February 24, 1953, Serial No. 338,422

4 Claims. (Cl. 56—341)

This invention relates to portable hay balers and the one disclosed in this application is an improvement over the one disclosed by the applicants' application Serial No. 210,708, filed February 13, 1951, now Patent 2,627,714.

Such portable hay balers, in addition to having a hay baling chamber in which a hay-compressing plunger reciprocates, are equipped with rotating means for picking up the hay from the ground and with cooperating means for moving the picked-up hay into the baling chamber. The present invention relates specifically to the means by which the picked-up hay is moved or fed into the baling chamber for compression into bales by the plunger.

It is customary, with the type of portable hay baler with which our present invention is concerned, to use a feeding assembly, which swings back and forth in an arc of approximately 90°, to move or feed the picked-up hay into the baling chamber. One of the difficulties with such feeding assemblies heretofore has been that considerable hay becomes spilled on to the ground. Some of this spilling occurs commonly at the rotary pick up means, due to the fact that the hay feeding assembly, upon its return swing back to the forward or starting position, either kicks some of the hay forwardly down over the pick up means or else fails to gather all the hay as it is delivered at the top of the rotating pick up means, thus causing some of the picked-up hay to drop back down to the ground. Additional spilling also commonly takes place at the top of the entrance to the baling chamber, either due to the fact that the top of the baling chamber is not entirely closed or to the fact that the feeding assembly does not push the hay far enough into the baling chamber entrance.

The object of our present invention is to prevent the tendency for hay to be spilled from the baler at either of these two places by providing more efficient means for moving the hay into the baling chamber.

In the accompanying drawings to which reference is made in the following brief description:

Fig. 1 is a top plan view of a portable hay baler showing the hay feeding assembly at its forward or starting position for the feeding stroke;

Fig. 2 is a fragmentary sectional elevation taken on line 2—2 of Fig. 1;

Fig. 3 is a similar sectional elevation illustrating the position of the feeding assembly after it has started its feeding swing or stroke towards the baling chamber entrance;

Fig. 4 is a fragmentary sectional elevation on line 4—4 of Fig. 1, drawn to a smaller scale, and showing the position of the feeding assembly in the end of the feeding swing or stroke;

Fig. 5 is a sectional elevation similar to Figs. 2 and 3 but illustrating the feeding assembly near the end of its return or outward stroke;

Fig. 6 is an enlarged fragmentary elevation of the hay feeding assembly taken on line 6—6 of Fig. 1;

Fig. 7 is a fragmentary plan section on line 7—7 of Fig. 6;

Fig. 8 is a fragmentary vertical section on line 8—8 of Fig. 6, being also a section on line 8—8 of Fig. 1 drawn to a larger scale;

Fig. 9 is a perspective view of the hay-engaging fingers of the hay feeding assembly; and Fig. 10 is a side elevation of the hay-engaging fingers, being also a fragmentary section corresponding to line 10—10 of Fig. 6, the hay-engaging fingers being shown in their normal or hay-engaging position in full line, with their inactive position, during the return of the stroke of the hay feeding assembly, shown in broken lines.

The hay baler shown in the drawings includes the usual hay baling chamber 10 (Fig. 4), in which the usual hay compressing plunger (not shown) reciprocates, and which chamber, unlike the baling chambers of similar hay balers heretofore, is entirely covered with a top cover plate 11 (Figs. 1 and 4). The hay is delivered into the chamber through the chamber entrance 12 (Figs. 3 and 4).

Rotating means, including a driven horizontal shaft 13 (Figs. 2, 3 and 5), mounted substantially at right angles with respect to the normal direction of travel of the portable hay baler, with which shaft hinged spaced radial fingers 14 are connected, picks up the hay from the ground in the usual manner and delivers it at the front of a receiving and collecting chamber 15. This receiving and collecting chamber has a curved outer and rear wall which leads to the entrance 12 into the hay baling chamber 10.

A feeding assembly, comprising a sweep device moving through an arc slightly greater than 90°, moves the hay through the receiving and collecting chamber 15 from the top of the rotating pick up means to and into the baling chamber 10. This feeding assembly includes a vertical shaft 16 (Fig. 6) rotatably mounted in a pair of bearing brackets 17 and 18. An integral arm 19 (see also Fig. 7) extending from shaft 16 is connected by composite spring linkage to a crank 20 (Figs. 1 and 7) on the end of a shaft, the latter shaft being connected with the driving mechanism for the reciprocating baling plunger. The connecting composite linkage includes a pair of telescoping rods 21 and 22 having pivotal connection with the arm 19 and crank 20 respectively. Cross bars 23 and 24, rigidly secured on the rods 21 and 22 respectively, carry a pair of slidably-mounted connecting bolts 25, 25 on which the coil springs 26, 26 are held under compression between the pair of cross bars 23 and 24. This composite link connection between the crank 20 and shaft arm 19 is so arranged as normally to produce oscillation of the shaft 16 (through an arc slightly more than 90°) with each revolution of the crank 20. The springs 26, 26 act to cushion and reduce the thrust movement imparted to the shaft arm 19 in the event excessive resistance to the rotation of shaft 16 in the corresponding direction is set up.

A bracket arm 27, shaped preferably in the manner shown in Fig. 1, is rigidly secured on the vertical shaft 16. A rod 28 has its inner end formed with an eye-loop 28' (Fig. 6) and is hinged to the bracket arm 27 near the shaft 16 by a vertical hinge pin 29. A finger-mounting bar 30 (Figs. 6 and 9) is secured at its ends to a pair of rings 31 and 32 which are rotatably mounted on the rod 28. A plurality (preferably three as shown in the drawings) of pairs of main and supplemental fingers 33 and 37 are secured to and extend downwardly from the mounting bar 30. The three main fingers 33 are identical, as shown in Fig. 9 and are formed with horizontal right angle bends 35 a short distance below the top, so that the lower major hay-engaging portion 36 of each finger will be inwardly offset from the upper portion 34. The purpose of having the lower or hay-engaging portions of these fingers 33 inwardly offset is to enable these portions to pass through the entrance 12 of the hay baling chamber and into the chamber a slight distance, as shown in Fig. 4, when the feeding assembly or sweep device reaches the inner end of its travel, thus pushing the hay ahead of the main fingers 33 completely into the hay baling chamber and compacting it there in preparation for the action of the hay compressing plunger subsequent to the withdrawal of the feeding assembly. With the lower or hay-engaging portions of the main fingers 33 inwardly offset in this manner it is possible to have the cover plate 11 of the hay baling chamber extend all the way over the entrance 12.

Heretofore in balers of this type, with the feeding assembly equipped with regulation fingers, it has been customary to have the cover plate of the hay baling chamber above the entrance into the chamber cut away so as to enable the hay feeding fingers to move into the chamber. The result has been that some of the hay was thrust out through the open portion of the cover plate and thus out from the top of the baling chamber in the feeding of the hay into the chamber and with the compression of the hay in the chamber, causing an appreciable spilling of hay from the baler in this manner.

The supplemental fingers 37 are shorter than the main fingers 33, do not have any offset portion, and extend down only a short distance below the horizontal portion or right angle bends 35 of the main fingers 33, as shown in Fig. 9, and thus do not extend down as far as the main fingers 33. Preferably, though not necessarily, these supplemental fingers 37 are positioned adjacent to the upper portions 34 of the main fingers 33 respectively and are secured to the main fingers as far down as the right angle bends 35.

A strip of angle iron 38 (shown most clearly in Fig. 10), the length of which is approximately equal to the spacing between the rings 31 and 32 of the bar 30 (Figs. 1 and 9) is welded or otherwise rigidly secured to the rod 28 between the rings 31 and 32 and thus keeps the bar 30 and the finger assembly from sliding along the rod 28 while enabling the entire finger assembly to swing up and down to a limited extent on the rod 28.

An upstanding bracket arm 39, which may comprise a short piece of similar angle iron, is welded or otherwise rigidly secured to the member 38, and a suspension bar 40, for supporting the outer end of the rod 28, and thus for supporting also the finger assembly, has one end attached to the bracket arm 39 and the other end secured to a cap 41 mounted on the top of the vertical shaft 16.

A spring-supporting bar 42 (Figs. 1 and 8) has one end bifurcated and hinged to a lug 43 on the rod 28, and the other end of the bar 42 extends through an opening in the bracket arm 27 and is slidable therein. This latter end of the bar 42 is threaded to accommodate a restricting nut 44. A coil spring 45 is carried on the bar 42 and has one end in engagement with the bracket arm 27 and the other end engaging a shoulder 46 formed near the inner bifurcated end of the bar 42 as shown in Fig. 8. As will be apparent from Fig. 1, the swinging of the bracket arm 27 in a horizontal plane produces corresponding swinging movement of the rod 28 and therewith of the finger assembly, while the spring 45 on the rod 42 will act to cushion the inward, or clockwise movement of the sweep device and of the thrust imparted to the rod 28 by the bracket arm 27.

A diagonal brace 47 (Figs. 9 and 10) extends across and is secured to each main finger 33 and to its associated supplemental finger 37. The upper end of each of these diagonal braces 47 is cut obliquely so as to engage the bottom face of the angle iron strip 38 when the fingers of the finger assembly are in vertical or hay-pushing position, and thus the engagement of these diagonal braces 47 with the strip 38 restrains further swing of the finger assembly in counterclockwise direction as viewed in Fig. 10 on the supporting rod 28. In order to limit the opposite forward or clockwise swing of the finger assembly on the rod 28 an engaging lug 48 is attached to the bracket 39 in position to be engaged by the finger assembly when the latter is swung upwardly. Thus, during the inward or operative sweep of the hay feeding assembly, the fingers 33 will be retained in vertical position to operate to push the hay through the hay collecting chamber 15 and into the baling chamber 10 through the baling chamber entrance 12, and during the outward or return or inactive swing back to starting position the fingers of the sweep device will swing up sufficiently to ride over the top of any hay in their path in the usual manner.

As mentioned in the beginning of this specification, one common difficulty heretofore with hay balers, which employ sweep devices to move the picked-up hay into the baling chamber, has been that, with the rapid return swing of the sweep device to starting position the hay-engaging fingers will kick some of the hay back down on to the ground and will also momentarily block some of the hay which is being picked up from the ground while the sweep device is reversing its direction to start its inward swing. With our improved finger assembly, due partly to the fact that the lower portions of the main fingers 33 are inwardly offset, and partly to the action of the supplemental fingers 37, most of the hay which would be kicked out or otherwise caused to drop back to the ground over the hay pick-up means when the sweep device is reversing itself in this outer position, will be caught by the tips of the supplemental fingers and momentarily arrested. Then, as the main fingers start to move inwardly, both the supplemental fingers and the continuing action of the pick-up means will cooperate to cause the outer portion of the hay which has been temporarily arrested to move on into the collecting chamber 15 behind the sweep device.

It is important in the proper carrying out of our invention that the supplemental fingers 37 should not be too long. Obviously if these supplemental fingers extended down as far as the main fingers 33 the supplemental fingers would then kick the hay back and block the lifted hay in exactly the same undesirable manner as heretofore has occurred with ordinary fingers on common hay sweep devices of this type. We have found that the supplemental fingers 37 preferably should not extend down more than half the distance which the offset portions 36 extend below the horizontal portions 35. The actual length of the offset portions 36 of the main fingers 33 will of course depend upon the size of the hay baler and particularly upon the height of the baling chamber 10 and of the entrance 12 to the hay baling chamber.

We claim:

1. In a hay baler of the character described having a baling chamber with top and side walls with a hay-receiving entrance in one of said side walls and having pick-up means extending substantially at right angles with respect to said baling chamber for picking up hay from the ground, an improved baler feed mechanism for delivering hay from said pick-up means into said baling chamber through said entrance, said feed mechanism including an arm assembly mounted on a substantially vertical shaft, means for oscillating said assembly in an arcuate path from said pick-up means to said baling chamber entrance, a plurality of spaced fingers hingedly supported on said arm assembly, each of said fingers having a portion offset in the direction of travel of said assembly when said assembly is moving from said pick-up means to said baling chamber entrance, the length of said offset finger portions being slightly less than the height of said baling chamber entrance, said arm assembly and said fingers so arranged that said offset finger portions will enter said baling chamber entrance as said arm assembly completes each swing from said pick-up means to said baling chamber, and means holding said fingers with said offset portions in substantially vertical position when said arm assembly and fingers are pushing hay towards and into said baling chamber entrance but permitting said fingers to swing to a limited extent from such vertical position when said arm assembly is moving in opposite direction from said baling chamber entrance, whereby said offset portions of said fingers, by passing into said baling chamber through said entrance in substantially vertical position, will cause the hay moved by said baler feed mechanism to be delivered effectively into the interior of said baling chamber.

2. In a hay baler of the character described having a baling chamber with top and side walls with a hay-receiving entrance in one of said side walls and having pick-up means extending substantially at right angles with respect to said baling chamber for picking up hay from the ground, an improved baler feed mechanism for delivering hay from said pick-up means into said baling chamber through said entrance, said feed mechanism including an arm assembly mounted on a substantially vertical shaft, means for oscillating said shaft and therewith said assembly in an arcuatae path from said pick-up means to said baling chamber entrance, a plurality of spaced identical fingers hingedly supported on said arm assembly and extending downwardly therefrom, each of said fingers having an identical portion offset below the top of the finger in the direction of travel of said assembly when said assembly is moving from said pick-up means to said baling chamber entrance, the length of said offset finger portions being slightly less than the height of said baling chamber entrance, said arm assembly and said fingers so arranged that said offset finger portions will enter said baling chamber entrance as said arm assembly completes each swing from said pick-up means to said baling chamber, and engaging means holding said fingers with said offset portions in substantially vertical position when said arm assembly and fingers are pushing hay towards and into said baling chamber entrance but permitting said fingers to swing to a limited extent from such vertical position when said arm assembly is moving in opposite direction from said baling chamber entrance, whereby said offset portions of said fingers, by passing into said baling chamber through said entrance in substantially vertical position, will cause the hay moved by said baler feed mechanism to be delivered effectively into the interior of said baling chamber.

3. In a hay baler of the character described having a baling chamber with top and side walls with a hay-receiving entrance in one of said side walls and having pick-up means extending substantially at right angles with respect to said baling chamber for picking up hay from the ground, an improved baler feed mechanism for delivering hay from said pick-up means into said baling chamber through said entrance, said feed mechanism comprising an arm assembly mounted on a substantially vertical shaft, means for oscillating said assembly in an arcuate path from said pick-up means to said baling chamber entrance, a plurality of spaced fingers hingedly supported on said arm assembly and extending downwardly therefrom, each of said fingers having a portion offset below the top of the finger in the direction of travel of said assembly when said assembly is moving from said pick-up means to said baling chamber entrance, the length of said offset finger portions being slightly less than the height of said baling chamber entrance, said arm assembly and said fingers so arranged that said offset finger portions will enter said baling chamber entrance as said arm assembly completes each swing from said pick-up means to said baling chamber, means holding said fingers with said offset portions in substantially vertical position when said arm assembly and fingers are pushing hay towards and into said baling chamber entrance but permitting said fingers to swing to a limited extent from such vertical position when said arm assembly is moving in opposite direction from said baling chamber entrance, whereby said offset portions of said fingers, by passing into said baling chamber through said entrance in substantially vertical position, will cause the hay moved by said baler feed mechanism to be delivered effectively into the interior of said baling chamber, and a plurality of supplemental fingers extending down from said arm assembly parallel to said offset portions of said first mentioned fingers, spaced from said offset portions in the direction of travel of said assembly when said assembly moves from said baling chamber to said pick-up means, said supplemental fingers extending downwardly considerably less distance than said offset portions of said first mentioned fingers and adapted to engage the top of the hay raised by said pick-up means when said assembly is in outer positions adjacent said pick-up means.

4. In a hay baler of the character described having a baling chamber with top and side walls with a hay-receiving entrance in one of said side walls and having pick-up means extending substantially at right angles with respect to said baling chamber for picking up hay from the ground, an improved baler feed mechanism for delivering hay from said pick-up means into said baling chamber through said entrance, said feed mechanism comprising an arm assembly mounted on a substantially vertical shaft, means for oscillating said shaft and therewith said assembly in an arcuate path from said pick-up means to said baling chamber entrance, a plurality of spaced identical fingers hingedly supported on said arm assembly and extending downwardly theerfrom, each of said fingers having an identical portion offset below the top of the finger in the direction of travel of said assembly when said assembly is moving from said pick-up means to said baling chamber entrance, the length of said offset finger portions being slightly less than the height of said baling chamber entrance, said arm assembly and said fingers so arranged that said offset finger portions will enter said baling chamber entrance as said arm assembly completes each swing from said pick-up means to said baling chamber, engaging means holding said fingers with said offset portions in substantially vertical position when said arm assembly and fingers are pushing hay towards and into said baling chamber entrance but permitting said fingers to swing to a limited extent from such vertical position when said arm assembly is moving in opposite direction from said baling chamber entrance, whereby said offset portions of said fingers, by passing into said baling chamber through said entrance in substantially vertical position, will cause the hay moved by said baler feed mechanism to be delivered effectively into the interior of said baling chamber, and an equal number of straight supplemental fingers extending down from the top portions of said first mentioned fingers parallel to said offset portions of said first mentioned fingers, said supplemental fingers extending downwardly considerably less distance than said offset portions of said first mentioned fingers and adapted to engage the top of the hay raised by said pick-up means when said assembly is in outer position adjacent said pick-up means.

References Cited in the file of this patent

UNITED STATES PATENTS

| Number | Name | Date |
|---|---|---|
| 2,487,938 | Nikkel | Nov. 15, 1949 |
| 2,545,188 | Baskerville | Mar. 13, 1951 |
| 2,572,180 | Morrison | Oct. 23, 1951 |